US008626981B1

(12) United States Patent
Roberts et al.

(10) Patent No.: US 8,626,981 B1
(45) Date of Patent: Jan. 7, 2014

(54) SAS EXPANDER WITH NON-BLOCKING VIRTUAL PHY ARCHITECTURE

(75) Inventors: Phillip Wayne Roberts, Colorado Springs, CO (US); Gregory Arthur Tabor, Colorado Springs, CO (US); Kurt Marshall Schwemmer, Colorado Springs, CO (US); John Matthew Adams, Colorado Springs, CO (US); Armando Garza Benavidez, Fountain, CO (US)

(73) Assignee: Maxim Integrated Products, Inc., San Jose, CA (US)

( * ) Notice: Subject to any disclaimer, the term of this patent is extended or adjusted under 35 U.S.C. 154(b) by 294 days.

(21) Appl. No.: 13/071,411

(22) Filed: Mar. 24, 2011

(51) Int. Cl.
G06F 13/00 (2006.01)
G06F 12/00 (2006.01)
G06F 13/14 (2006.01)
G06F 13/38 (2006.01)

(52) U.S. Cl.
USPC .......................................... 710/316; 710/241

(58) Field of Classification Search
USPC ................................................. 710/316, 241
See application file for complete search history.

(56) References Cited

U.S. PATENT DOCUMENTS

| 6,798,744 | B1 * | 9/2004 | Loewen et al. ............... 370/235 |
| 7,496,700 | B1 * | 2/2009 | Chong et al. .................... 710/52 |
| 7,574,542 | B2 * | 8/2009 | Burroughs et al. ............. 710/74 |
| 7,624,206 | B2 * | 11/2009 | Bailey et al. .................... 710/51 |
| 7,644,168 | B2 * | 1/2010 | Grieff et al. .................... 709/229 |
| 7,953,917 | B2 * | 5/2011 | Seto .............................. 710/300 |
| 8,116,226 | B1 * | 2/2012 | Liao et al. ...................... 370/254 |
| 8,255,607 | B2 * | 8/2012 | Jones et al. .................... 710/316 |
| 8,352,649 | B2 * | 1/2013 | Liu et al. .......................... 710/62 |
| 8,443,117 | B2 * | 5/2013 | Katano et al. ................... 710/19 |
| 2004/0190554 | A1 * | 9/2004 | Galloway ....................... 370/474 |
| 2006/0271722 | A1 * | 11/2006 | Marushak et al. ............ 710/316 |
| 2007/0100847 | A1 * | 5/2007 | Slutz et al. ..................... 707/100 |
| 2007/0162592 | A1 * | 7/2007 | Marks et al. ................... 709/224 |
| 2007/0274231 | A1 * | 11/2007 | Marks et al. ................... 370/254 |
| 2009/0094620 | A1 * | 4/2009 | Kalwitz et al. ................. 719/325 |

(Continued)

FOREIGN PATENT DOCUMENTS

| JP | 07212551 A | * | 8/1995 | ............... H04N 1/23 |
| JP | 2000020447 A | * | 1/2000 | ............... G06F 13/14 |
| JP | 2012108905 A | * | 6/2012 | ............... G06F 13/14 |

OTHER PUBLICATIONS

"NNRD43197: Double Tape Recording Techniques (Data Security Mode, Performance Mode)", Mar. 1, 2000, IBM Technical Disclosure Bulletin, Iss. 431, p. 518.*
"NN9409307: Device Arbitration and Selection Method for Personal Computers", Sep. 1, 1994, IBM Technical Disclosure Bulletin, vol. 37, Iss. 9, pp. 307-312.*

(Continued)

Primary Examiner — Faisal M Zaman
(74) Attorney, Agent, or Firm — TIPS Group

(57) ABSTRACT

A SAS expander includes a switch core, a number of SAS expander phys coupled to the switch core, an SMP originator coupled to the switch core and an SMP receptor coupled to the switch core. In an embodiment, the SMP originator is configured to only send connection requests and the SMP receptor is configured to only receive connection requests. Program instructions stored in non-transient digital storage media include code segments detecting a new connection request, code segments determining whether the new connection request is in conflict with an existing connection request and code segments determining if there is a free destination receptor phy. In an embodiment, the free destination receptor phy is never operationally used for an origination of a connection request.

2 Claims, 6 Drawing Sheets

(56) References Cited

U.S. PATENT DOCUMENTS

2009/0235130 A1* 9/2009 Cagno et al. .................. 714/715
2012/0246521 A1* 9/2012 Washiya et al. ................. 714/48
2012/0311224 A1* 12/2012 Myrah et al. .................. 710/316

OTHER PUBLICATIONS

Penokie, George, "Information Technology-SAS Protocol Layer (SPL)", Working Draft American National Standard, Project T10/2124-D, Revision 07, Jul. 21, 2010, pp. 1-680.

* cited by examiner

SAS EXPANDER WITH NON-BLOCKING VIRTUAL PHY ARCHITECTURE

BACKGROUND

Serial Attached SCSI (SAS) is a computer bus used to move data to and from computer storage devices such as hard drives and tape drives. SAS depends on a point-to-point serial protocol that replaces the parallel SCSI bus technology that first appeared in the mid 1980s in data centers and workstations, and it uses the standard SCSI command set. A typical SAS system includes one or more "Initiators", one or more "Targets" and a "Service Delivery Subsystem." A Service Delivery Subsystem may include one or more "Expanders."

An Initiator is a device that originates device-service and task-management requests for processing by a target device and receives responses for the same requests from other target devices. For example, Initiators may be provided as an onboard component on the motherboard (as is the case with many server-oriented motherboards) or as an add-on host bus adaptor.

A Target is a device containing logical units and target ports that receive service (e.g. disk service) and task management requests for processing and sends responses for the same requests to initiator devices. Examples of target devices are hard disks and disk array systems.

A Service Delivery Subsystem is part of an input/output (I/O) system that transmits information between an Initiator and a Target. Typically cables and connectors connecting an Initiator and a Target comprise a Service Delivery Subsystem. Optionally, Expanders or backplanes can be considered a part of the Service Delivery Subsystem.

Expanders are devices that form part of a Service Delivery Subsystem and facilitate communication between SAS devices. Expanders facilitate the connection of one or more Initiators to one or more Targets.

The SAS architecture includes six layers, namely the Physical layer, the Phy layer, the Link layer, the Port layer, the Transport layer and the Application layer. The T10 technical committee of the International Committee for Information Technology Standards (INCITS) and affiliates develop and maintain the SAS protocol and define the architecture of the various layers. See, for example, *Information technology—SAS Protocol Layer (SPL)*, Revision 07, 21 Jul. 2010, American National Standard for Information Technology, Ref. No. ISO/IEC 14776-261:201 X, incorporated herein by reference in its entirety, and hereafter referred to as *SAS Protocol Layer*. On pages 19-20 of *SAS Protocol Layer*, "SAS" is defined as "Serial Attached SCSI", "SCSI" is defined as "Small Computer System Interface family of standards", and "SMP" is defined as Serial Management Protocol.

Expanders, as noted above, can be used to allow one or more Initiators to communicate with one or more Targets. When a connection request is made by an Initiator for communication with a Target, or by a Target for a communication with an Initiator, one or more Expanders can attempt to provide a pathway between the Initiator and the Target. An Expander implementing SAS protocols as used herein may be alternatively referred to as a "SAS expander."

An example SAS expander 10 of the prior art includes a switch core 12, a plurality of SAS expander phys 14 coupled to the switch core 12, and one or more SMP internal ports 16 coupled to the switch core 12. The example SAS expander 10 also includes, in this example, a microcontroller (µC) 18 and memory 20. SAS expander 10 often forms a part of an integrated circuit 22 as will be appreciated by those of skill in the art.

The SAS expander phys 14 typically include a link layer 24, a phy layer 26 and a serial transceiver 28. The SMP internal ports 16 typically each include a link layer 30 and a virtual phy connection 32. As noted by the arrows 34, the SAS expander phys 14 each can operate as a connection originator and as a connection receptor.

In typical implementations, a SAS expander 10 has but a single SMP internal phy. As used herein, a "phy" is a single endpoint for transmitting and receiving data and a "port" is one or more phys that share the same SAS address. If the port is busy in a connection, then other requests for the port will wait for the pending connection to terminate. If, for example, the SAS expander 10 is operating as a connection receptor it will not be able to operate as a connection originator until it is done. This can be a problem during high traffic congestion periods. Adding additional SMP virtual phys can help with this problem, but there is always the problem of having all SMP virtual phys busy servicing incoming connection requests, thereby precluding operation as a connection originator until one of the pending connections terminates.

An example of high traffic congestion occurs during a "self-configuration" process of a SAS expander. Self-configuration is an integral part of SAS protocol in which SAS expanders discover all other devices in their domain and fill out their routing tables. During self-configuration, many requests to open pathways ("OPEN" requests) are competing for a limited number of SMP internal phys, leading to the OPEN requests waiting an excessive amount of time for the SMP internal phys to become available.

During self-configuration (and other high traffic situations) there will be contention between multiple SAS expanders that are trying to connect to each other. This contention will result in one SAS expander backing off and accepting a higher priority connection request from another SAS expander, forcing the prior lower priority connection to be dropped and retried. This requires complex firmware and covers a larger set of boundary conditions. As a rough rule of thumb, with two interconnected SAS expanders undergoing self-configuration, roughly twice as much time is required to complete the set of requests in progress due to this contention.

These and other limitations of the prior art will become apparent to those of skill in the art upon a reading of the following descriptions and a study of the several figures of the drawing.

SUMMARY

By way of example and not limitation, an improved SAS expander includes: a switch core; a number of SAS expander phys coupled to the switch core; an SMP originator coupled to the switch core, the SMP originator being configured to send connection requests; and an SMP receptor coupled to the switch core, the SMP receptor being configured to receive connection requests.

By way of further example and not limitation, program instructions stored in non-transient digital storage media include: code segments detecting a new connection request; code segments determining whether the new connection request is in conflict with an existing connection request; and code segments determining if there is a free destination receptor phy, where the free destination receptor phy is not operationally used for an origination of a connection request.

By way of further example and not limitation, a method for operating an expander includes: directing an incoming connection request to a virtual phy receptor of the expander, wherein the virtual phy receptor is not used for sending outgoing connection requests; and sending outgoing connection requests from a virtual phy originator of the expander, wherein the virtual phy originator is not used for receiving incoming connection requests.

By way of non-limiting example, certain embodiments are effective to increase the operational efficiency of a SAS expander system, particularly during periods of high traffic congestion such as during self-configuration of large domains.

These and other embodiments and advantages and other features disclosed herein will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTIONS

Figure 1:
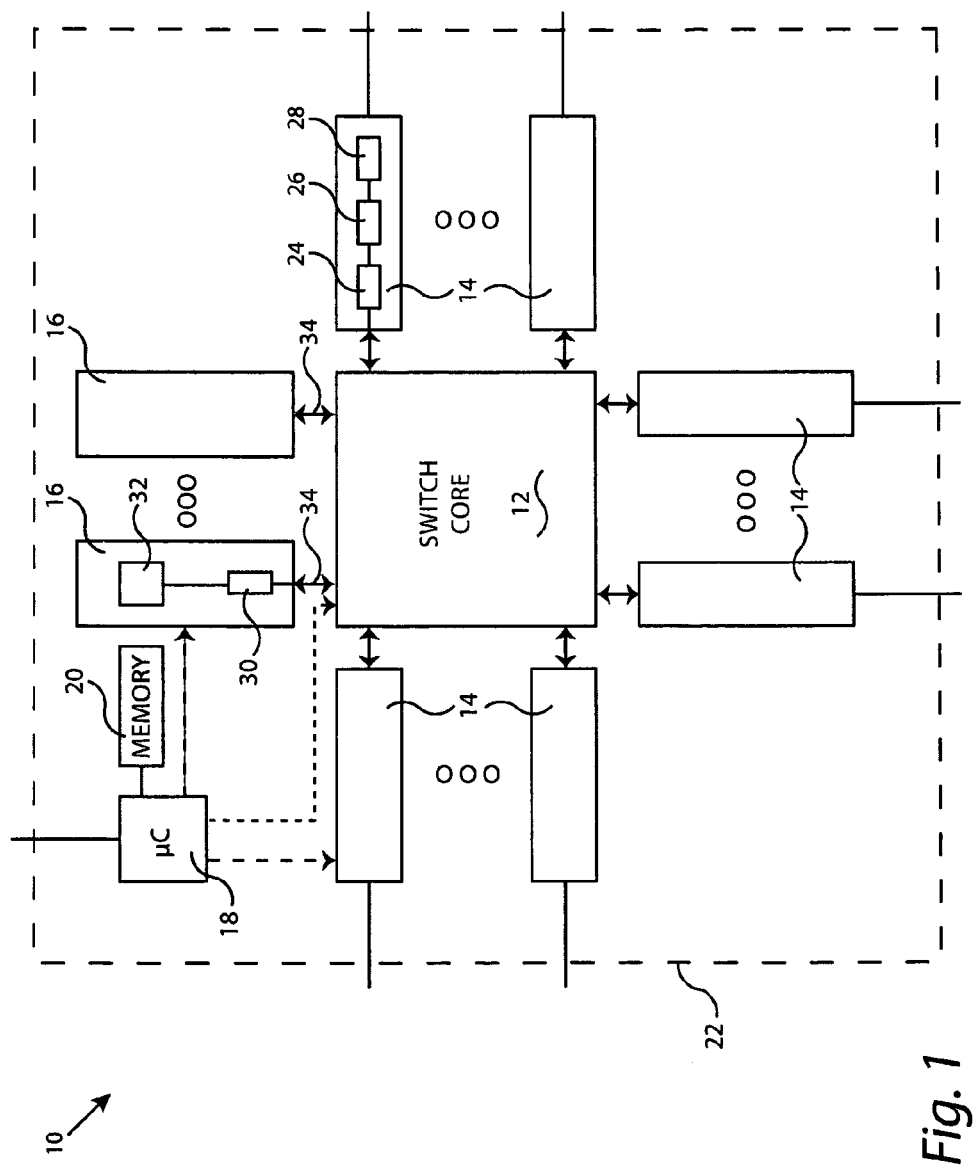
FIG. 1 is a block diagram of a SAS expander of the prior art.

FIG. 1 was described with reference to the prior art. Like reference numerals will refer to like components in the descriptions set forth herein.

Figure 2:
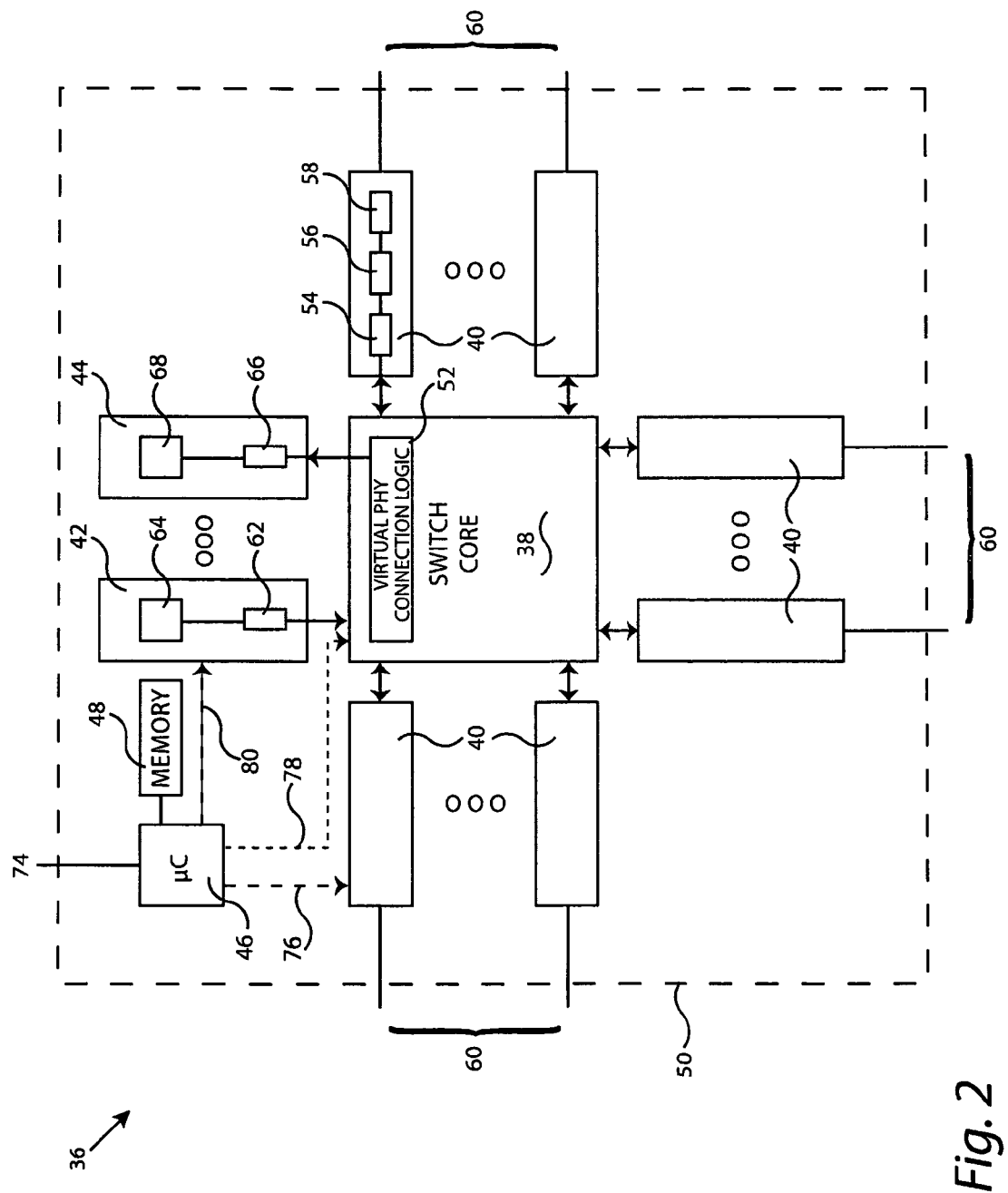
FIG. 2 is a block diagram of an improved SAS expander, set forth by way of example and not limitation.

FIG. 2 is block diagram, set forth by way of example and not limitation, of a SAS expander 36 including a switch core 38, a plurality of SAS expander phys 40 coupled to the switch core 38, a SMP originator 42 coupled to the switch core 38, and a SMP receptor 44 coupled to the switch core 38. The SAS expander 36 also includes, in this example, a microcontroller (μC) 70 and memory 72. SAS expander 38 often forms a part of an integrated circuit 50, as will be appreciated by those of ordinary skill in the art.

As used herein, by way of example, a "switch core" refers to circuitry implementing Expander Connection Manager (ECM) and Expander Connection Router (ECR) functionalities. As well known to those of skill in the art, an ECM implements a control function that sets up and tears down connections and the ECR comprises a crossbar multiplexer, for example, that routes the actual data. Switch core 38 includes virtual phy connection logic 52 which ensures that an "incoming" connection request from a SAS expander phy 40 is routed only to a SMP receptor 44. That is, in this example, logic 52 never routes an incoming connection request to a SMP originator 42. Logic 52 can take many forms, including discrete logic, state machines, microcontrollers, etc.

SAS expander phys 40 preferably include a link layer 54, a phy layer 56, and a serial transceiver 58. An arbitrary number of SAS expander phys 40 can be provided depending upon the application. For example, twelve SAS expander phys 40 can be provided. The link layers 54 of the SAS expander phys 40 are coupled to switch core 38 for bidirectional communication, and the serial transceivers 58 provide bidirectional serial data links to other devices (including, for example, other SAS expanders) which may be within or outside of integrated circuit 50.

SMP originator 42 includes a link layer 62 and a "virtual phy" connection originator 64. It should be noted that SMP originator 42, in this example, is used only to originate connection requests. In this example, one or more SMP originators 42 may be coupled to switch core 38.

SMP receptor 44 includes a link layer 66 and a "virtual phy" connection receptor 68. It should be noted that SMP receptor 44, in this example, is used only to receive connection requests. In this example, one or more SMP receptors 44 may be coupled to switch core 38.

It should be noted that SMP originator 42 and SMP receptor 44 are "asymmetrical" and "non-blocking" in that one is used only for originating connections and one is used only for receiving connections. This type of virtual phy architecture where a pair of virtual phys has one virtual phy used only for originating connections and has another virtual phy used only for receiving connections may referred to herein as "an asymmetrical virtual phy architecture" and/or as "a non-blocking virtual phy architecture."

Microcontroller 70 provides programmable logic control for SAS expander 36. By way of non-limiting example, microcontroller 70 can be a MIPS microcontroller core developed by MIPS Technologies of Sunnyvale, Calif. Other microcontrollers, microprocessors, etc. are also suitable examples of programmable logic devices. In other examples, microprocessor 70 may be replaced with other forms of logic, such as state machines, or eliminated.

Microcontroller 70 is coupled to memory 72 (e.g. non-transitory computer readable media) which can be provided "on chip" as shown or which may be accessed "off chip" by a connection 74. Suitable memory 72 includes, without limitation, RAM, ROM, EPROM, flash memory, etc. In other examples, memory 72 may be replaced with other forms of memory or eliminated.

Microcontroller 70 can be connected to SAS expander phys 40, switch core 38, SMP originators 42 and SMP receptors 44 as indicated by broken lines 76, 78 and 80, respectively, to connect to provide programmable logic control for SAS expander 36. The program, comprising a plurality of code segments, can be stored, for example, in memory 72 or elsewhere.

Figure 3:
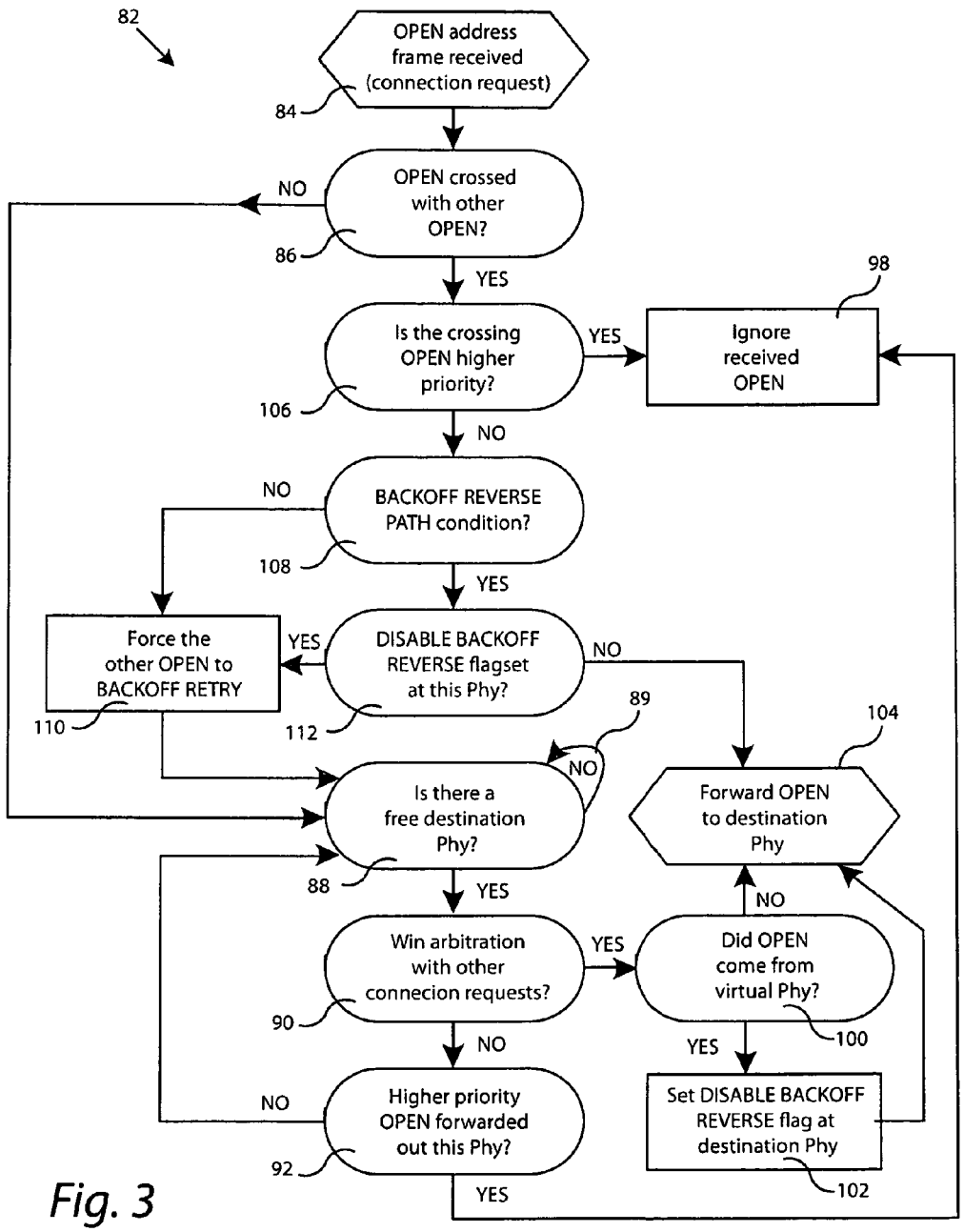
FIG. 3 is a flow diagram of a non-limiting example process which can be implemented by the SAS expander of FIG. 2.

FIG. 3 is a flow diagram of a non-limiting example process 82 which can be implemented by SAS expander 36. By way of non-limiting example, process 82 may include program instructions stored in memory 72 or elsewhere and implemented by microcontroller 70. By way of further non-limiting example, process 82 may provide programmable logic control of the link layers 54, 62 and 66 of FIG. 2.

The process 82 is initiated with an OPEN address frame received ("connection request") event 84. A decision operation 86 determines if the OPEN that was just received has crossed with an OPEN that had previously been forwarded by the same phy. If not, an operation 88 determines if there is a free destination phy. If not, operation idles as indicated at 89 until there is a free destination phy. Once a destination phy is available, a decision operation 90 determines whether there are multiple OPEN requests vying for that destination phy in an arbitration process. If the OPEN request does not win the arbitration with the other OPEN requests (e.g. because it has a lower priority that a competing OPEN request), a decision operation 92 determines whether the higher priority OPEN was forwarded from the destination phy. If not, process control returns to operation 88. If decision operation 92 determines that the higher priority OPEN was forwarded from the destination phy the received OPEN is ignored (e.g. "dropped") in an operation 98 and the process 82 is completed.

If decision operation 90 determines that the OPEN request won the arbitration with other competing OPEN requests, such as by being the highest priority OPEN request, a decision operation 100 determines whether the OPEN request came from a virtual phy. If so, an operation 102 sets a DISABLE/BACKOFF flag for that destination phy and the OPEN is forwarded to the destination phy in an operation 104, and the process 82 is completed. If operation 100 determines that the OPEN did not come from the virtual phy, the OPEN is forwarded to the destination phy in operation 104 without setting the flag.

If operation 86 determines the received OPEN has crossed with a high priority OPEN that had been previously forwarded by the same phy, a decision operation determines if the crossing OPEN is of a higher priority. If so, the received OPEN is ignored in operation 98 and process 82 is completed. If the crossing OPEN is not of a higher priority, a decision operation 108 determines if there is a BACKOFF REVERSE PATH condition. If not, the other ("crossing") OPEN is forced to the BACKOFF RETRY condition, after which operational control is given to operation 88.

If decision operation 108 determines that there is a BACKOFF REVERSE PATH condition, a decision operation 112 determines if the DISABLE/BACKOFF flag is set for the destination phy. If not, the received open is forwarded to the destination phy in operation 104 and the process 82 is completed. If the DISABLE/BACKOFF flag is set for the destination phy, operation control is given to operation 110 to force the other OPEN to the BACKOFF RETRY condition.

The various protocols described herein are defined by industry standards. For example, the definitions of OPEN, BACKOFF REVERSE PATH, BACKOFF RETRY and other protocols are coordinated by the aforementioned T10 technical committee of the INCITS. As another example, the SAS expander link layer and arbitration behavior are described in Clause 7 of SAS-1.1 and SAS-2.0 and Clause 6 of the SPL (SAS Protocol Layer) standard (which substantially the same as SAS2.1). These standards can be found, for example, at http://t10.org/drafts.htm. SAS-1.1, having a full title of Serial Attached SCSI-1.1, is dated 2005 Sep. 21, Rev. 10, ANSI INCITS 417-2006, and is incorporated herein by reference in its entirety. SAS-2, having a full title of Serial Attached SCSI-2, is dated 2009 Apr. 18, Rev. 16, ANSI INCITS 457-2010, and is also incorporated herein by reference in its entirety. SPL, having a full title of SAS Protocol Layer, is dated 2010/07/21, Rev. 07, and is designated T10 Project 2124-D, and is also incorporated by reference in its entirety.

It will be appreciated from the forgoing that the example SAS expander 36 has an asymmetric architecture because, unlike the prior art, the virtual phys are either originators ("send only") or receptors ("receive only"). In this example, each SAS expander 36 has one or more SMP originators 42 and one or more SMP receptors 44. In this example, the switch core 38 ensures that OPEN requests are only directed to SMP receptors 40. Also, in this example, microcontroller 70 ensures that OPEN requests are only sent from SMP originators 42. Therefore, SMP originators 42 and SMP receptors can be of the same design (e.g. capable of both originating and receiving) and logic external to these virtual phy can determine how they operate. Alternatively, as other non-limiting examples, SMP originators and SMP receptors can be of different designs and/or external logic coupled to these virtual phy can be modified or eliminated.

It will be appreciated that process 82 handles the standard BACKOFF REVERSE PATH protocol differently than in the prior art due to the asymmetric architecture of its virtual phys. This allows SAS expander 36 to use the same SAS address for both the SMP originator 42 and the SMP receptor 44 without routing incoming OPEN requests to the SMP originator 42.

By way of non-limiting example, if SMP originator 42 originates a connection through a SAS expander phy 40, BACKOFF REVERSE PATH is disabled for that SAS expander phy 40. If an OPEN request comes in on the same link into that SAS expander phy 40, the BACKOFF REVERSE PATH is disallowed, so that a BACKOFF RETRY occurs instead, and the partial pathway initiated by the SMP originator is torn down. This allows the incoming OPEN to be routed by the switch core 38 to the SMP receptor 44. The SMP originator then takes a non-blocking path out of a different SAS expander phy 40.

Figure 4:
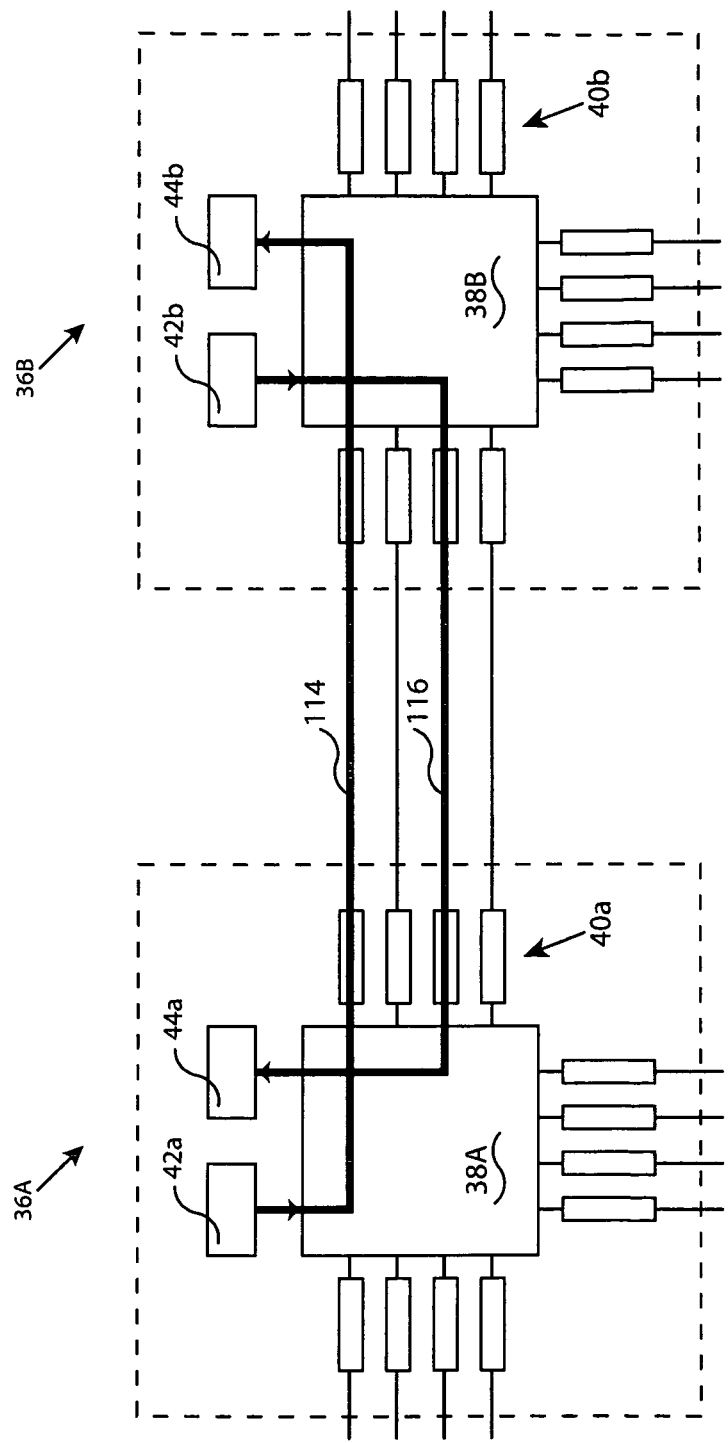
FIG. 4 is a block diagram including two interconnected SAS expanders in a first non-limiting operating example.

FIG. 4 is a block diagram including two interconnected SAS expanders 36A and 36B in a first non-limiting operating example. The asymmetric architecture of SAS expanders allows two simultaneous paths 114 and 116 between the virtual phys without any contention. As a result, each SAS expander 36 can simultaneously handle both an incoming connection and an outgoing connection.

Figure 5:
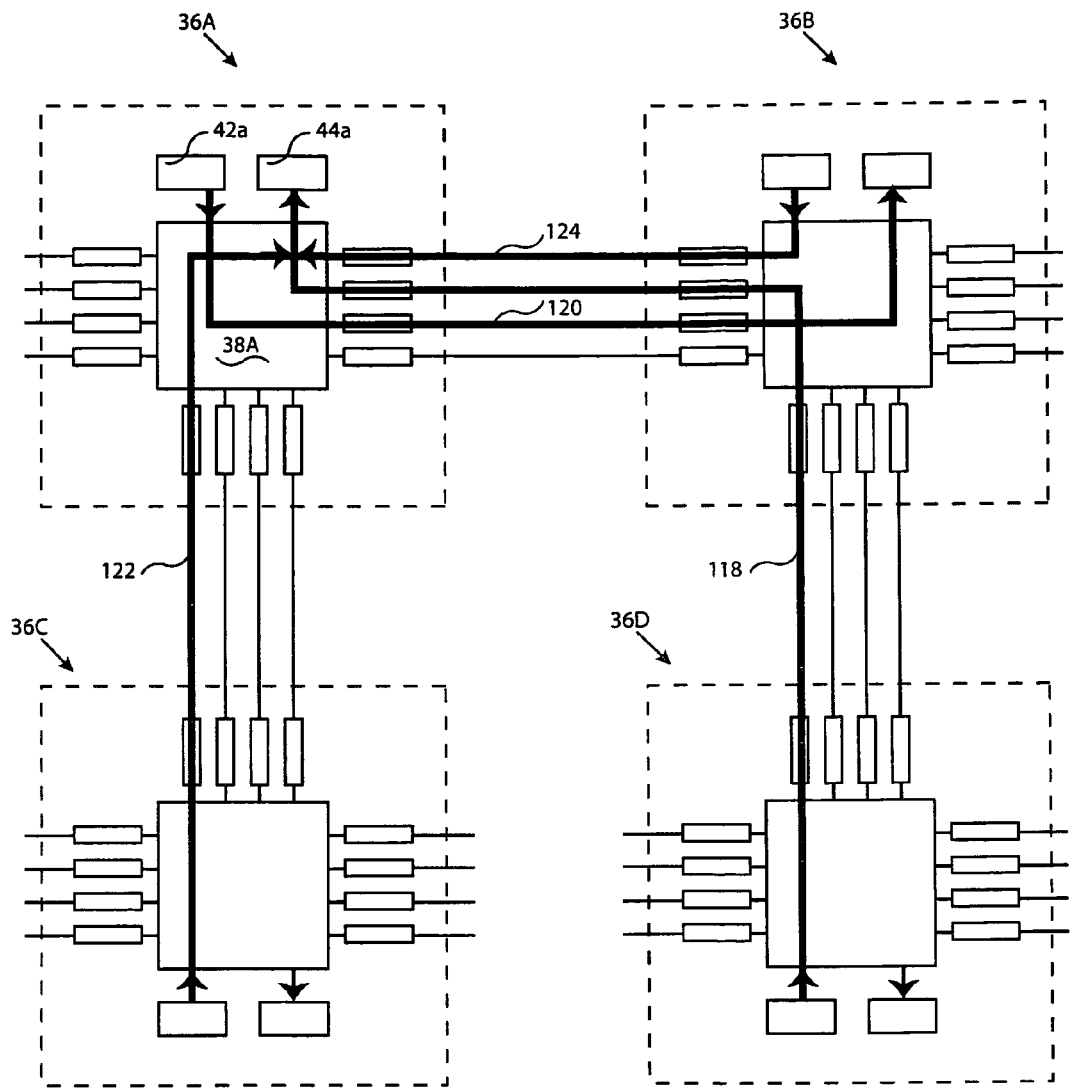
FIG. 5 is a block diagram including four interconnected SAS expanders in a second non-limiting operating example.

FIG. 5 is a block diagram including four interconnected SAS expanders 36A, 36B, 36C and 36D in a second non-limiting operating example. In this example, SAS expander 36A is receiving multiple pending incoming requests indicated by pathways 118, 122 and 124, all of which are routed by switch core 38A to SMP receptor 44A. These multiple requests will be arbitrated and one (pathway 118 in this example) will win and be connected to the SMP receptor 44A. Despite the multiple incoming requests, the SMP originator 42A is still free to make an outgoing request on pathway 120. In this example, only SAS expander 36A has two successful pathways to and from other SAS expanders 36.

Figure 6:
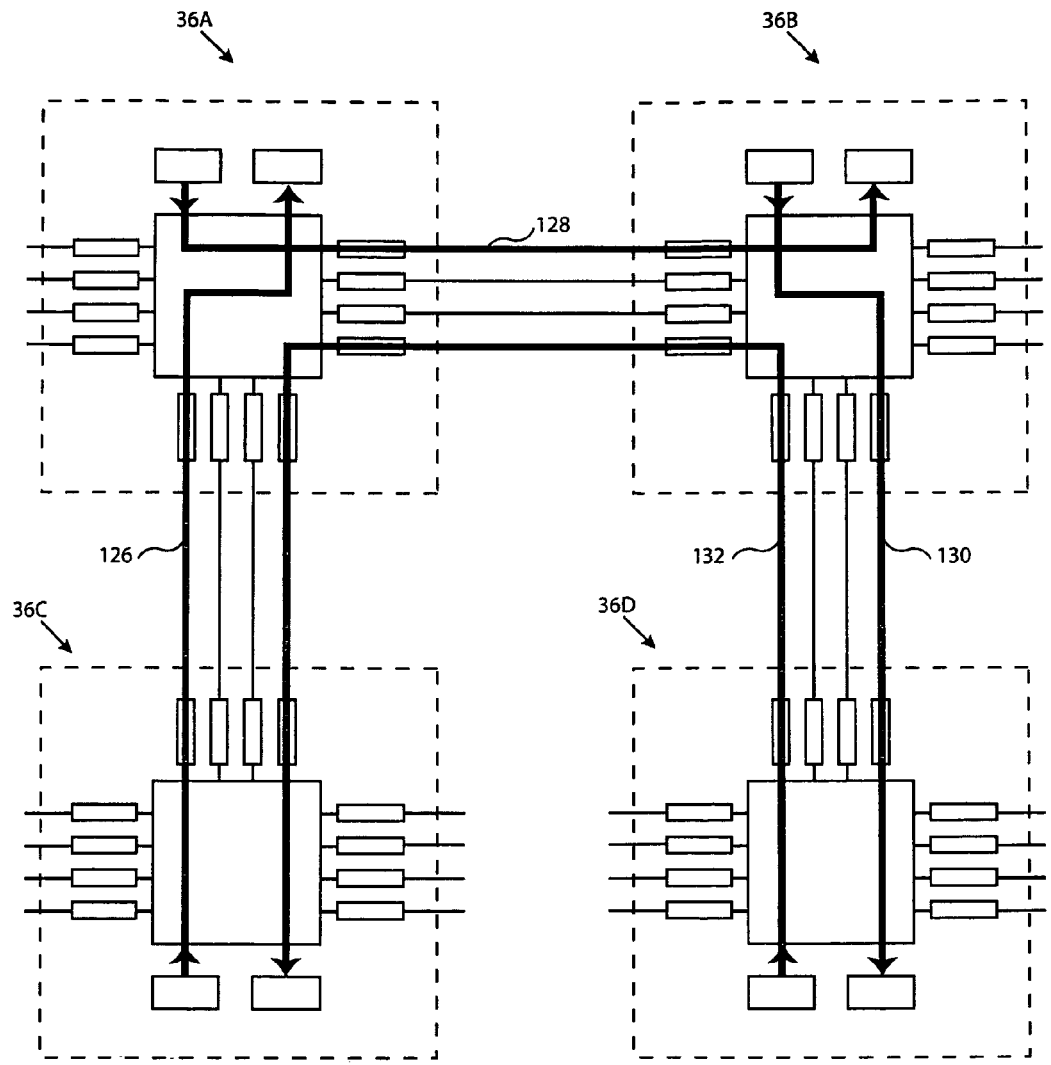
FIG. 6 is a block diagram including four interconnected SAS expanders in a third non-limiting operating example.

FIG. 6 is a block diagram including four interconnected SAS expanders 36A, 36B, 36C and 36D in a third non-limiting operating example. In this example, each of the SAS expanders 36 has a successful path to and from another SAS expander, namely pathways 126, 128, 130 and 132 in this example. This is a very efficient configuration, as will be appreciated by those of skill in the art.

While various examples have been described in relation to SMP virtual phys, it should be noted that other protocols embodied in SAS technology are also applicable, e.g. SSP virtual phys. Furthermore, a asymmetrical virtual phy architecture ("non-blocking virtual phy architecture") is useful in other protocols, such as the new protocols related to PCI-Express, currently under development by the T10 committee. It is therefore intended that the concepts, combinations, and architectures as set forth herein to include such alternative protocols.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A SAS expander comprising:
 a switch core;
 a plurality of SAS expander phys coupled to said switch core;
 a Serial Management Protocol (SMP) originator coupled to said switch core, said SMP originator being configured to send connection requests, wherein said switch core is configured to not direct to said SMP originator an incoming connection request from an SAS expander phy;
 an SMP receptor coupled to said switch core, said SMP receptor being configured to receive connection requests; and
 a programmable controller configured to not direct to said SMP receptor an outgoing connection request to be sent to an SAS expander phy, said programmable controller including a microcontroller coupled to non-transient digital storage media storing program instructions including
 (a) code segments detecting a new connection request,
 (b) code segments determining whether said new connection request is in conflict with an existing connection request,
 (c) code segments determining if there is a free SMP receptor,
 (d) code segments for arbitrating connection requests for said free SMP receptor if it is determined that there is a free SMP receptor, said arbitrating connection requests determining a winning connection request,
 (e) code segments for forwarding said winning connection request to said free SMP receptor, and
 (f) code segments which disable BACKOFF REVERSE PATH for said free SMP receptor if said winning connection request came from a virtual phy.

2. A SAS expander as recited in claim 1 comprising code segments stored in said non-transient digital storage media forcing a BACKOFF RETRY if there is no BACKOFF REVERSE PATH condition or if said BACKOFF REVERSE PATH for said free SMP receptor is disabled.

* * * * *